United States Patent Office 2,991,183
Patented July 4, 1961

2,991,183
FUNGICIDAL AND BACTERICIDAL COMPOSITIONS
Seymour J. Lederer, Fair Lawn, and Robert O. Weiss, West Milford, N.J.; said Lederer assignor to Metalsalts Corporation, Hawthorne, N.J., a corporation of Delaware
No Drawing. Filed Jan. 2, 1958, Ser. No. 706,586
26 Claims. (Cl. 106—18)

The present invention relates to compositions suitable for use as disinfectants generally, but particularly as fungicides, insecticides, and ovicides, and also as bactericides, to their manufacture, and to preparations containing the same.

More specifically, the invention relates to compositions consisting principally of phenyl mercuric propionate but containing also from 3 to 15% of di-(propionoxy mercuri) benzene, formed during the synthesis of the monopropionate, this mixture, for the sake of brevity, being at times referred to hereinafter as "phenyl mercuric propionate composition" or as "propionate composition."

It is the general object of the invention to provide compositions which are suitable for general use as disinfectants, and especially as fungicides, sporicides and bactericides.

More particularly, it is an object of the invention to provide solutions containing a phenyl mercuric propionate composition which are of such high concentration and are compatible to such a high degree with aqueous media as well as with various organic media, that they may be effectively employed in paper manufacture, in the mildewproofing of aqueous and oil vehicle paints, and of fabrics, for the disinfection of seeds and plants, and in various other industries where protection against fungi, insects, and bacteria is a desideratum.

It is a more specific object of the invention to provide relatively high concentration solutions, and also dusts and pastes, of a phenyl mercuric propionate composition which can be employed for the disinfection of seeds, plants, soil, paints, intermediate and final paper products, lubricating and other oils, fabrics, and in other products and processes requiring disinfection.

It is a still further object of the invention to provide a phenyl mercuric propionate composition in a granular form which dissolves relatively easily in water and in many organic solvents; and it is also an object of the invention to provide the propionate composition in an easily frangible and dispersible solid form which will dissolve readily in water or other solvents to form solutions of various useful concentrations, whereby transportation costs are reduced, and losses minimized such as occur from the spilling of liquid preparations.

Other objects and advantages of the invention will appear from the following description and the features of novelty will be set forth in the appended claims.

The powerful anti-fungal and anti-bactericidal properties of organic mercurial compounds have long been known, but their use in industry has been severely limited because of their low solubilities. Whatever the intended function of the organic mercurial, a satisfactory degree of solubility either in water or in suitable organic solvents was a prerequisite; and in every field in which organic mercurials were employed or for which such compounds were suggested, it has been the constant endeavor to synthesize organic mercurials of greater solubility than those already known. However, the phenyl mercuric salts heretofore employed in industry all have poor solubility in water. The solubility of these salts in various organic solvents (e.g., for the preparation of liquid compositions which can be mixed with oil paints and varnishes) is not much better, if at all, than the solubility in water. Thus, phenyl mercuric acetate is soluble in varnish makers' naphtha only to the extent of 0.1% by weight, and in xylene it is scracely more soluble (0.3% by weight). In Cellosolve, it dissolves to the extent of 3.3% and in benzene to the extent of 1.5%.

These solubilities are insufficient to enable phenyl mercuric acetate to be used for many purposes, as the necessarily large volume of solution would result in an undesirable dilution of paints, varnishes and other compositions to be protected by the mercuric salt; and in the case of the disinfection of seeds, plants and the like, large volumes would similarly have to be mixed or sprayed in order to leave a sufficient deposit to insure protection for a satisfactory period of time. With this low solubility is coupled a further disadvantage, namely, the difficulty of dissolving the solid material in the various solvents. For this reason, the compound is always sold in the form of a solution, as users cannot be depended upon to take the trouble to insure complete solution of the salt in the employed solvent. However, because of its low solubility, it can be marketed only in the form of very dilute solutions, which results in excessive transportation costs. Moreover, the dealer is compelled to keep, in stock, solutions of the salt in a variety of solvents to meet the requirements of different customers. In addition, the transportation of the salt in solution form presents a considerable hazard in the event of breakage of a container, not only because the salt is highly toxic, but also because many of the solvents are flammable.

It has been sought to obtain phenyl mercuric salts of greater solubility in vegetable oils and in oil paint solvents and diluents by preparing phenyl mercuric salts of the higher members of the fatty acid series. These phenyl mercuric salts of the higher fatty acids had the disadvantage in that a relatively large quantity of salt had to be employed for a given weight of mercury, upon which alone the anti-fungal and anti-bacterial activity is based. Thus, in the case of phenyl mercuric oleate, about 2.8 parts of salt had to be employed to obtain the effect of one part of mercury. This was particularly objectionable in paint manufacture in which it is usually sought to add as little solid as possible which is of non-pigment character to the paint composition.

For the mildew-proofing of water-base paints, phenyl mercuric acetate has not proven to be satisfactory because of the difficulty of dissolving it in water and because of its low solubility in water. The use of phenyl mercuric salts of higher fatty acids in aqueous compositions has not heretofore appeared possible because of the known reduction of water-solubility with increasing molecular weights of the fatty acids.

The present invention is based upon our discovery that, contrary to the prior experience of low water- and oil-solubility of phenyl mercuric salts of fatty acids, and contrary to the prior experience that the water-solubility of salts of the fatty acids decreases with increasing molecular weights of the acids, our phenyl mercuric propionate composition possesses an entirely unique and unexpected set of properties in connection with its solubility in water and in organic solvents, which makes it exceptionally useful as an anti-fungal and anti-bacterial preparation in many industrial fields. Instead of being less water-soluble than phenyl mercuric acetate, it is much more water-soluble; and instead of being far less soluble in vegetable oils and in various organic solvents miscible with such oils than the higher fatty acid salts of the phenyl-mercuric moiety, it is more highly soluble in these substances and extraordinarily so in many of them.

Our phenyl mercuric propionate containing from 3 to 15% of the di-(propionoxy mercuri) benzene, is far more soluble in water, in vegetable oils, and in organic solvents, than the phenyl mercuric propionate prepared prior to the present invention. The known phenyl mercuric propionate has been described as being insoluble in water (Whitmore, "Organic Compounds of Mercury" page 176); and the U.S. patent to Schwerdle, No. 2,754,241, suggests solubilizing the insoluble compound by pouring the reaction mixture containing the same into an ammonia-formamide mixture.

The extreme insolubility of phenyl poly-(mercuric acetate), which practically exclusively takes the form of the di-(acetoxy mercuri) benzene, has long been recognized, and efforts have heretofore always been directed toward preventing the production of the polymercurated along with the monomercurated compound.

We have found, however, that a phenyl mercuri propionate containing from 3 to 15% of the di-mercurated compound is not only far more soluble than the known propionate and other fatty acid salts in various solvents, but is at least as active as an equivalent weight (with reference to the Hg content) of the pure monopropionate; in other words, the di-(propionoxy mercuri) benzene is a powerful fungicide and bactericide. The preparation of our improved composition is accordingly so conducted that at least 3% and as much as 15% of the di-mercurated benzene are contained in the product. We have discovered that direct reaction of 1-part of mercuric oxide with 3 to 7 parts by weight each of benzene and propionic acid will yield a product with the desired properties. The reactions are carried out best with approximately equal weights of benzene and propionic acid, but these weights may vary.

The composition of the present invention differs in a surprising manner in its solubilities in various solvents, both polar and non-polar, from other phenyl mercuri salts, and even from phenyl mercuric acetate and butyrate which are the next lower and higher homologues. For example, it is 3 times as soluble in water as the acetate or butyrate, and 13 times as soluble in varnish makers' naphtha as the acetate and more than 5 times as soluble in such solvent as the butyrate, all on the basis of the mercury content. Whereas homologous compounds usually show a gradation of properties in one direction, e.g., gradual and progressive increases or decreases in solubility in a particular solvent, we have found that our phenyl mercuric propionate composition is an outstanding exception to the general rule. This is shown by the following table:

TABLE I

| Phenyl Mercuric Salt | Solubility in H₂O as percent Hg | Solubility in Naphtha as percent Hg |
| --- | --- | --- |
| Formate | 0.08 | 0.24 |
| Acetate | 0.12 | 0.10 |
| Propionate Composition | 0.36 | 1.30 |
| N-butyrate | 0.13 | 0.25 |
| N-valerate | 0.02 | 0.69 |
| N-caproate | 0.01 | 0.13 |
| N-enanthate | 0.02 | 0.32 |
| N-caprylate | 0.03 | 0.67 |
| N-undecylate | 0.02 | 0.57 |
| N-myristate | 0.02 | 0.06 |
| N-palmitate | 0.08 | 0.26 |

The table shows that our propionate composition is much more soluble than the formate and acetate in water and, likewise contrary to the general rule, it is much more soluble in a common organic solvent (naphtha) than the salts of the higher homologous acids. The solubilities of our propionate composition are in fact by far the highest, both in water and in the organic solvent.

In the above table, the percent Hg is indicated rather than percent of the complete compound to compare true active concentrations of both high and low molecular weight compounds.

We have found further that the anomalously high solubility of our phenyl mercuric propionate composition (PMP) as compared to phenyl mercuric acetate (PMA) and phenyl mercuric butyrate (PMB) holds true not only for water and varnish makers' naphtha, but also for many other polar and non-polar solvents which we have investigated. Table II shows the comparative solubilities of these salts in the common and commercially economical polar and non-polar solvents:

TABLE II

Solubility as percent Hg (wt./wt.)

| Solvent | PMA | PMP | PMB |
| --- | --- | --- | --- |
| Water | 0.1 | 0.4 | 0.1 |
| Naphtha | 0.1 | 1.3 | 0.2 |
| Diethyl Ether | 0.3 | 9.2 | 2.5 |
| Ethylene Glycol | 3.2 | 11.4 | 2.5 |
| Solox (ethanol) | 3.1 | 17.2 | 5.6 |
| Butyl Carbitol Acetate (ethylene glycol monobutyl ether acetate) | 3.1 | 18.0 | 9.0 |
| Benzene | 0.8 | 27.4 | 9.5 |
| Toluene | 0.6 | 18.7 | 5.6 |
| Xylene | 0.2 | 19.1 | 2.4 |
| Carbon Tetrachloride | 0.1 | 28.1 | 1.4 |

From known data on other series of homologous organic compounds, it would normally be expected that as the length of the carbon chain increased, the water-solubility would decrease while the oil-solubility would increase. Hence a compound of this type which might have sufficient water-solubility to be used in water paints would not be suitable for oil paints, and conversely, an oil-soluble compound would not be compatible with water paints.

As will be evident from the foregoing, in the case of our phenyl mercuric propionate composition, this normal behavior in relation to the lower and higher homologues does not obtain. On the contrary, this salt is compatible with oil paints, and is of relatively high solubility in both aqueous and oily media and in the common solvents and diluents for oil paints.

The relatively high degree of solubility of our phenyl mercuric propionate composition in polar and non-polar solvents and its pronounced fungicidal and bactericidal activity combine to make it a highly effective agent for the control and destruction of a variety of fungi and bacteria. Some of these organisms are of great commercial interest because of their presence as contaminants and as causative agents of deterioration and spoilage in the paint industry and the development of slimes in paper and pulp. The following illustrates the anti-fungal and anti-microbial action of our improved composition:

A. *Mildewcidal action in paints.*—The following data were obtained on tests of the efficacy of the phenyl mercuric propionate composition of the present invention (PMP), at a concentration of 0.15% in the paint composition, to inhibit *Pullularia pullulans,* the most common contaminant of paints, in films prepared from the paints:

1. OIL-BASE PAINT SYSTEMS

| | Unleached specimen | | | Leached specimen | | |
| --- | --- | --- | --- | --- | --- | --- |
| | 1 wk. | 3 wks. | 4 wks. | 1 wk. | 3 wks. | 4 wks. |
| PMP | z.0 | z.0 | z.0 | z.0 | z.0 | z.0 |
| Untreated control | 5 | 10 | 10 | 7 | 10 | 10 |

2. WATER-BASE PAINT SYSTEMS

| | Unleached specimen | | | Leached specimen | | |
| --- | --- | --- | --- | --- | --- | --- |
| | 1 wk. | 3 wks. | 4 wks. | 1 wk. | 3 wks. | 4 wks. |
| PMP | z.0 | z.0 | z.0 | z.0 | 0 | 0 |
| Untreated control | 10 | 10 | 10 | 10 | 10 | 10 |

Unleached specimen: represents the application of the treated paint sample to paper and tested as such.
Leached specimen: represents sample which, after application of treated paint to paper and drying, is then left in running water (3 gal./hr. at 25° C.) for 24 hrs. The purpose is to test the ability of the inhibitor to withstand the leaching effect of rain.
0=no growth.
10=very heavy growth.
1–9=increasing coverage and density of coverage.
The symbol z.0 means no growth on the paint and no growth in the zone around it.

B. *Bactericidal and fungicidal action in paper and pulp manufacture.*—The phenyl mercuric propionate composition of our invention has shown marked effectiveness in the control of organisms causing slime formation and bacterial contamination, two factors which are of great economic importance in the manufacture of paper and paper board.

Following are the data of tests using our composition (PMP) as a bactericide and fungicide against the most common contaminants encountered in the paper industry.

[INHIBITING CONCENTRATIONS [1] (PARTS PER MILLION)]

| Organisms | Aerobacter areogenes | Bacillus mycoides | Aspergillus niger | Penicillium expansum |
|---|---|---|---|---|
| PMP | 2 | 0.2 | 5 | 5 |

[1] Ref.—Conkey, J. H., and Carlson, John A.: Relative Toxicity of Disinfectants Available for Use in the Pulp and Paper Industry, 1956 Suppl., Institute of Paper Chemistry, Appleton, Wisconsin, 1956.

The fungicidal and bactericidal compositions containing phenyl mercuric propionate can be marketed in a variety of forms. Thus, the compositions can be in the form of solutions, pastes and dusts. While the preferred solvents for the preparation of solutions are xylene and Cellosolve, solutions can also be prepared with water; hydrocarbons, like naphtha, mineral spirits and other petroleum distillates, like kerosene and heavy lubricating oil; benzene and toluene; ethylene glycol and its ethers and esters; various solvents for linseed oil and oleoresinous materials, like turpentine, pine oil and the like; aliphatic and aromatic esters, like ethyl acetate, propionate and benzoate, benzyl benzoate, and the like; ketones, like acetone, methyl ethyl ketone, etc.; and halogenated solvents such as chloroform, carbon tetrachloride, ethylene chloride, and chlor-benzene. Mixtures of various solvents may also be employed such as xylene-naphtha, toluene-mineral spirits, and the like, in the non-polar systems; and Cellosolve-water, alcohol-water, Carbowaxes-water, and the like in the polar systems. The composition can also be mixed with various inert solid diluents for use on plants and seeds and in the soil. It can also be applied to seeds in the form of solutions or slurries in non-toxic solvents or suspending agents.

In the course of our investigations we found that the production of phenyl mercuric propionate in solid form presents many problems. Unlike phenyl mercuric acetate, which melts at 150° C., the propionate is a low melting substance (melting point about 80° C.). When the preparation was carried out according to the prior art, a heavy oil was obtained which either could not be solidified or required extended standing, sometimes at low temperatures, for conversion into a solid product.

Normally, the purer a product is, the more rapidly it will solidify. Our initial investigations were aimed at the preparation of a very pure product to insure rapid solidification. Surprisingly, it was found that the pure product solidifies slowly into a waxy substance which can be handled only with great difficulty. Attempts to grind this material for subsequent handling were unsuccessful. We have found, however, that in the presence of 3–15% of di-(propionoxy mercuri) benzene, the solidification time of the propionate is greatly decreased. Thus within 1 to 6 hours a granular product was obtained which could be easily handled in the plant.

Di-(propionoxy mercuri) benzene is a high melting material. Although we do not wish to be understood as being committed to this explanation, it appears that the first-congealed particles of the di-mercurated compound act as seeds in the oily mass, causing the phenyl mercuric propionate to solidify, and resulting in an easily dried, easily ground product.

The surprisingly high and wide range of solubility of our composition may well be due to the physical form of the material described above. Thus, the pure phenyl mercuric propionate is a slightly waxy powder which does not wet easily and, on agitation, tends to agglomerate to some extent. The combination of phenyl mercuric propionate and di-(propionoxy mercuri) benzene is granular and wets quite easily.

Satisfactory methods for the preparation of the composition of the present invention are set out in detail by way of illustration in Examples 1 and 2.

EXAMPLE 1

25 gms. of mercuric oxide, 150 gms. of benzene, and 150 gms. of propionic acid were charged into a 500 cc. flask. The mixture was refluxed to complete reaction (14 hours). The unreacted liquid material was stripped off in vacuo to yield a heavy viscous oil which was dropped into a kettle fitted with a heavy-duty agitator and a cooling jacket. The reaction mixture was cooled with good agitation and the mixture rapidly solidified to a granular mass. This solid could easily be removed and dried in a vacuum oven to remove the last traces of volatile residue. Yield is 39.5 gms. or 97% and contained 9% di-(propionoxy mercuri) benzene.

EXAMPLE 2

25 gms. of mercuric oxide, 100 gms. of benzene and 100 gms. of propionic acid were charged into a 500 cc. flask and refluxed for 15 hours, at which time reaction was complete. The unreacted liquid material was stripped off in vacuo and the heavy oil thus obtained was poured into 200 ccs. of water. The material solidified within 2 hours. The solid material was filtered off and dried in vacuo. Yield 36.4 gms. or 91% yield. This product contained 10% of dimercurated material.

The following examples illustrate the manner in which our improved phenyl mercuric propionate composition, containing from 3 to 15% of the di-(propionoxy mercuri) benzene, may be utilized in the formulation of various fungicidal, insecticidal and bactericidal preparations:

EXAMPLE A

Phenyl mercuric propionate composition __grams__ 200
Xylene _____cc__ 935

The salt composition and solvent are stirred for from ½ to several minutes and then filtered to yield a clear solution which is stable on storage and contains about 20% of the phenyl mercuric propionate composition. This solution is suitable for use as a mildewcide in oil paints. If desired, the concentration of the salt composition can be increased to 40%.

EXAMPLE B

Grams
Phenyl mercuric propionate composition _____ 500
Cellosolve _____ 300

The materials are stirred for 30 minutes and then clarified to yield a clear solution containing 47% of the composition. The solution is an effective mildewcide for oil paints.

EXAMPLE C

Phenyl mercuric propionate composition __grams__ 230
Xylene _____cc__ 500
Varnish-makers' naphtha _____cc__ 500

The xylene and naptha are mixed and to the mixture is added the phenyl mercuric propionate composition. After stirring for about 30 minutes, the solution is clarified and there is obtained a solution containing about 20% of phenyl mercuric propionate. This solution is likewise suitable for use as a mildewcide in oil paints and other oleaginous materials, such as oil varnishes, linoxyn preparations, alkyd resins, etc.

Example D

| | Grams |
|---|---|
| Phenyl mercuric propionate composition | 80 |
| Water | 40 |
| Methyl cellulose | 2 |
| Dispersing agent | 3 |

On mixing these several components, there is obtained a stable paste which disperses easily in further quantities of water and can be used advantageously in seed and plant treatment.

For use in the paper and pulp industry, a more or less concentrated solution of the phenyl mercuric propionate composition in water or in an alcohol-water mixture can be employed.

Example E

| | Percent |
|---|---|
| Phenyl mercuric propionate composition | 2 to 30 |
| Clay, talc, calcium silicate or other inert diluent or mixtures thereof | 70 to 98 |

To this mixture is added about 1 to 5%, based on the weight of such mixture, of a wetting or dispersing agent, preferably of the long-chain sulfonic acid ester type. Among the wetting and dispersing agents that can be employed are Tergitols, Tweens, Spans, and Tritons. The content of the phenyl mercuric propionate composition in the dusts can range from 2 to 30%, but we prefer to employ a concentration of from 20 to 25%. The mixture can be reduced in a ball or pebble mill to a fine powder, and can be applied in the form of dust or as a suspension in water to seeds just before planting. The dust can also be sprayed either in a solid or suspension form on plants and on the soil.

We have found further that for economy in transportation, our phenyl mercuric propionate composition can be easily fused and cast into various shapes with the aid of simple molds. On cooling, a solid product is obtained which is strong and resistant to crumbling, so that it can be transported without danger of loss. When similarly melted, phenyl mercuric acetate undergoes considerable decomposition, which is evidenced by the darkening of the product and the appearance of metallic mercury in the mold.

It is, however, desirable that the solidified salt composition be easily dispersed in water or other solvent. In a further development of the invention, we have found that the solidified mass can be made more porous, so that it will crumble easily in water and other solvents, by the addition of certain substances. Thus, by incorporating about 5 to 50% of ethylene glycol in the salt composition, a product is obtained which is resistant to crushing in the dry state, but will crumble easily when immersed in the same solvent or in a solvent miscible with the entrained solvent. Ethylene glycol ether and esters have proved to be even more effective than ethylene glycol and can be used in approximately the same proportions. The addition of a wetting or dispersing agent of a long-chain sulfonic acid ester type (to the extent of about 1 to 5% by weight of the mixture) also aids in the dispersion of the solid product. This solid product can be shipped without danger of damage or loss, which would occur if a container containing a liquid preparation were broken.

Our preparation can be incorporated in aqueous and oleoresinous paints in any suitable manner, as by grinding the granular or powdered salt composition with the pigment, or by mixing it with the finished paint with the aid of an agitator. It can also be added in the form of a solution or paste with water or volatile organic solvent. Tests have shown that paint films containing from 0.05 to 0.75% of our composition (based on the whole paint composition) have retained their fungistatic activity even after being heated to 160° F. for a considerable period of time; hence, the films will remain protected even after exposure to the summer sun. For preventing the growth of molds in oleaginous materials generally, a concentration of our composition as low as 0.01% will usually be effective. In the case of cutting and other lubricating oils, a concentration as low as 1 part of our composition in from 100,000 to 1,000,000 of the oil will effectively reduce the danger of infection in the event of a cut or abrasion on the body of a workman.

The following formulations illustrate the use of our fungicidal composition in otherwise known aqueous and oil-base or oleoresinous paints:

Example F

This formulation is identical with that described on page 18 of "Celanese Synthetic Resin Emulsions" (1957), except that it is modified by the substitution of our phenyl mercuric propionate for the PMA (phenyl mercuric acetate) of the publication:

*Standard primer sealer*
STRAIGHT TITANIUM DIOXIDE

| | Parts by weight |
|---|---|
| Tergitol NP-14 (ethylene oxide non-ionic wetting agent) or Igepal CO-430 | 2. |
| R & R 551 (water-dispersed Lecithin) | 3. |
| Potassium carbonate | 1. |
| Ethylene glycol | 13. |
| Carbitol | 23. |
| Rutile titanium dioxide—chalk resistant | 150. |
| 325 mesh WG mica | 50. |
| Asbestine 3X (talc) | 50. |
| Water (add incrementally during pigment addition to maintain heavy paste) | 100. |
| | 392. |
| Add in the order listed and mix as a heavy paste for a minimum of 20 minutes then add: | |
| Colloids 581B (defoamer) | 2. |
| Water | (*). |
| | 394. |
| Disperse on a three-roll mill and letdown with: | |
| 2% Cellosize WP-4400 solution (hydroxy methyl cellulose) | 200. |
| Phenyl mercuric propionate composition | 0.3 |
| R & R 551 (water-dispersed Lecithin) | 3. |
| Water | 78. |
| Celanese CL-202 (polyvinyl acetate emulsion) | 276. |
| Water and/or 2% Cellosize WP-4400 solution) for viscosity adjustment | 100. |
| | 1051. |

*Note.—Adjustments for other types of dispersing equipment can be readily made by varying the amount of water in the pigment paste.

Example G

The following latex formulation is also of a water-base paint and is taken from page 6 of "Bakelite Tech. Bulletin" 225 (Oct. 1957) except for the addition of the fungicide of the present invention:

*White interior wall paint—water based*

| | Parts by weight |
|---|---|
| Vinyl acetate resin latex | 274.0 |
| Titanium dioxide | 214.0 |
| Aluminum silicate | 108.0 |
| Water | 347.1 |
| Dibutyl phthalate | 16.2 |
| Ammonium polyacylate (15%) | 28.9 |
| Ethylene glycol | 26.0 |
| Diethylene glycol monoethyl ether | 18.7 |
| Hydroxy ethyl cellulose | 63.4 |
| Non-ionic dispersant (ethylene oxide type) | 3.2 |
| Phenyl mercuric propionate composition | 3.0 |

Example H

Except for the last ingredient, the following oil base paint composition is taken from Cabot & Co. Tech. Serv. Lab. Report No. W Pai 4, Oct. 1957, page 5:

*Alkyd flat paint—oil type*

| | Parts by weight |
|---|---|
| 30% titanium calcium (30%) | 410 |
| Titanium dioxide | 105 |
| Wollastonite P-4 [1] | 125 |
| Glyceryl monooleate | 5 |
| Odorless alkyd resin | 356 |
| Low odor mineral spirits | 10 |
| Odorless mineral spirits | 153 |
| 24% Pb naphthenate | 2.4 |
| 6% Co naphthenate | 1.2 |
| Phenyl mercuric propionate composition | 3.5 |

[1] Mixture of magnesium and calcium silicates and carbonates.

Example I

The same Cabot & Co. publication discloses on page 3 another oil-base point to which has been added the fungicide of the present invention, as follows:

*Linseed oil type paint*

| | Parts by weight |
|---|---|
| Rutile titanium dioxide | 150 |
| Acicular zinc oxide | 150 |
| Wollastonite P-1 [1] | 580 |
| Raw linseed oil | 291 |
| Bodied linseed oil | 96 |
| 24% Pb naphthenate | 9.6 |
| 6% Mn naphthenate | 1.28 |
| Mineral spirits | 113 |
| Phenyl-mercuric propionate composition | 2 |

[1] Mixture of silicon dioxide, calcium oxide, iron oxide, aluminum oxide, manganese oxide, magnesium oxide, titanium dioxide.

Because of the relatively low molecular weight of phenyl mercuric propionate as compared with the oleate, considerably less of our composition will be employed for a given fungicidal effect. This is of particular advantage in paints in which it is desirable to add as little extraneous material as possible and to have the solids contained in the vehicle constituted as much as possible of pigment to produce maximum coverage. Thus, to obtain, for example, a 10% concentration of mercury (whether it be a powder, solution, paste or slurry), only about 17% content of the composition of the present invention is necessary in contrast to the 28% salt concentration required in the case of phenyl mercuric oleate. As much effective mercury is shipped in 100 lbs. of our solid propionate composition as in the 450 lb. drums in which solutions of the acetate or oleate are presently sold.

The preparation of our composition in the form of a concentrated paste is advantageous in certain seed and plant treatment techniques. Such a paste may be prepared with 80 gms. of our phenyl mercuric propionate composition, 40 gms. water, 2 gms. methyl cellulose, and 3 gms. of a dispersing agent of any known and suitable type, such as those disclosed herein. On agitation, this mixture yielded a stable paste which dispersed easily in further quantities of water.

We claim:

1. A solution of a phenyl mercuric propionate composition having from 3 to 15% of di-(propionoxy mercuri) benzene, the remainder of the composition consisting essentially of mono-(propionoxy mercuri) benzene, in a water-miscible organic solvent containing at least about 10% of the composition in solution.

2. A solution of a phenyl mercuric propionate composition having from 3 to 15% of di-(propionoxy mercuri) benzene, the remainder of the composition consisting essentially of mono-(propionoxy mercuri) benzene, in a water-miscible organic solvent containing at least about 20% of the composition in solution.

3. An approximately 20% solution of a phenyl mercuric propionate composition in ethylene glycol, said composition having from 3 to 15% of di-(propionoxy mercuri) benzene, the remainder of the composition consisting essentially of mono-(propionoxy mercuri) benzene.

4. An approximately 30% solution of a phenyl mercuric propionate composition having from 3 to 15% of di-(propionoxy mercuri) benzene, in ethanol, the remainder of the composition consisting essentially of mono-(propionoxy mercuri) benzene.

5. A Cellosolve solution of a phenyl mercuric propionate composition having from 3 to 15% of di-(propionoxy mercuri) benzene, the remainder of the composition consisting essentially of mono-(propionoxy mercuri) benzene, said solution containing at least 30% of the composition in solution.

6. Process for mildew-proofing an oil-base paint which comprises mixing the same with a solution of a phenyl mercuric propionate composition having from 3 to 15% of di-(propionoxy mercuri) benzene, the remainder of the composition consisting essentially of mono-(propionoxy mercuri) benzene, in an aromatic hydrocarbon solvent miscible with vegetable oils and containing at least 10% by weight of the composition.

7. Process for mildew-proofing an oil-base paint which comprises mixing the paint with an at least 20% solution in xylene of a phenyl mercuric propionate composition having from 3 to 15% of di-(propionoxy mercuri) benzene, the remainder of the composition consisting essentially of mono-(propionoxy mercuri) benzene.

8. Process for mildew-proofing paints which comprises mixing the same with a quantity of an at least 20% solution in Cellosolve of a phenyl mercuric propionate composition having from 3 to 15% of di-(propionoxy mercuri) benzene, the remainder of the composition consisting essentially of mono-(propionoxy mercuri) benzene.

9. An aqueous paint having dispersed therein a phenyl mercuric propionate composition having from 3 to 15% of di-(propionoxy mercuri) benzene, the remainder of the composition consisting principally of mono-(propionoxy mercuri) benzene, said composition being present in small proportion, but sufficient to render dried films of the paint resistant to mildew.

10. An anti-fungal and anti-microbial preparation whose active component consists essentially of mono-(propionoxy mercuri) benzene containing from 3 to 15% of di-(propionoxy mercuri) benzene.

11. An anti-fungal and anti-microbial preparation in the form of a granular mass whose active component consists essentially of mono-(propionoxy mercuri) benzene containing from 3 to 15% of di-(propionoxy mercuri) benzene.

12. An anti-fungal and anti-microbial preparation in the form of a fused solid mass whose active component consists essentially of mono-(propionoxy mercuri) benzene containing from 3 to 15% of di-(propionoxy mercuri) benzene, said mass having incorporated therein a more readily soluble material which, on mixing of the solid mass with a solvent, dissolves more quickly in said solvent than does the propionoxy component and thereby facilitates disintegration and solution of said solid mass in the solvent.

13. A preparation as defined in claim 12, wherein the more readily soluble material consists of a solvent which is miscible both with water and liquid hydrocarbons and which, on mixing of the solid mass with water or a liquid hydrocarbon, facilitates disintegration and solution of said solid mass in the solvent.

14. A solution of the preparation defined in claim 10, in a liquid solvent containing at least 10% of the mono- and di-(propionoxy mercuri) benzene mixture in solution.

15. A solution of an anti-fungal and anti-microbial preparation whose active component consists essentially of mono-(propionoxy mercuri) benzene containing 3 to 15% of di-(propionoxy mercuri) benzene, in an aromatic hydrocarbon solvent miscible with vegetable oils, said solution containing at least 10% by weight of the preparation.

16. A solution of an anti-fungal and anti-microbial preparation whose active component consists essentially of a phenyl mercuric propionate composition containing from 3 to 15% of di-(propionoxy mercuri) benzene, in an aromatic hydrocarbon solvent miscible with vegetable oils, said solution containing at least 35% by weight of the composition.

17. A xylene solution of an anti-fungal and anti-microbial preparation whose active component consists essentially of a phenyl mercuric propionate composition containing from 3 to 15% of di-(propionoxy mercuri) benzene, said solution containing at least 10% by weight of the composition.

18. A paint having dispersed therein an anti-fungal preparation whose active component consists essentially of a mono-(propionoxy mercuri) benzene containing from 3 to 15% of di-(propionoxy mercuri) benzene, said preparation being present in small proportion, sufficient to render dried films of the paint resistant to mildew.

19. An oil-base paint having dispersed therein a small proportion of an at least 20% solution, in a volatile organic solvent, of an anti-fungal preparation whose active component consists essentially of mono-(propionoxy mercuri) benzene containing from 3 to 15% of di-(propionoxy mercuri) benzene.

20. An oil-base paint having dispersed therein a small proportion of an approximately 40% solution in xylene of an anti-fungal preparation whose active component consists essentially of mono-(propionoxy mercuric) benzene containing from 3 to 15% of di-(propionoxy mercuri) benzene.

21. An oil-base paint having dispersed therein a small proportion of an at least 20% solution, in an oil-miscible solvent, of an anti-fungal preparation whose active component consists essentially of mono-(propionoxy mercuric) benzene containing from 3 to 15% of di-(propionoxy mercuri) benzene.

22. Process for the preparation of a phenyl mercuric propionate composition containing from 3 to 15% of di-(propionoxy mercuri) benzene, the remainder of the composition consisting essentially of mono-(propionoxy mercrui) benzene, which comprises refluxing 1 part by weight of mercuric oxide with from 3 to 7 parts by weight of each of benzene and propionic acid for such period of time that on stripping the product in vacuo, a heavy oil is obtained, stripping off unreacted liquid material in vacuo, and cooling the heavy oil and recovering the total solid product so formed.

23. Process for the preparation of a phenyl mercuric propionate composition containing from 3 to 15% of di-(propionoxy mercuri) benzene, the remainder of the composition consisting essentially of mono-(propionoxy mercuri) benzene, which comprises reacting 25 parts by weight of mercuric oxide with about 150 parts by weight of each of benzene and propionic acid for such period of time that on stripping the product in vacuo, a heavy oil is obtained, stripping off unreacted liquid material in vacuo, and cooling the heavy oil and recovering the total solid product so formed.

24. Process according to claim 22, wherein the reaction is conducted under reflux for about 14 to 16 hours.

25. Process according to claim 22, wherein the oily residue is cooled under agitation until it solidifies to a granular mass.

26. Process according to claim 22, wherein the oily residue is poured into water to effect solidification.

References Cited in the file of this patent
UNITED STATES PATENTS

| | | |
|---|---|---|
| 2,050,018 | Rentschler | Aug. 4, 1936 |
| 2,075,971 | Bake | Apr. 6, 1937 |
| 2,157,010 | Perkins | May 2, 1939 |
| 2,411,815 | Sowa | Nov. 26, 1946 |
| 2,754,241 | Schwerdle | July 10, 1956 |